(12) United States Patent
Cole

(10) Patent No.: US 11,469,534 B1
(45) Date of Patent: Oct. 11, 2022

(54) JUNCTION BOX

(71) Applicant: Jace Cole, Baton Rouge, LA (US)

(72) Inventor: Jace Cole, Baton Rouge, LA (US)

(*) Notice: Subject to any disclaimer, the term of this patent is extended or adjusted under 35 U.S.C. 154(b) by 0 days.

(21) Appl. No.: 17/345,986

(22) Filed: Jun. 11, 2021

(51) Int. Cl.
*H01R 4/66* (2006.01)
*H01R 13/422* (2006.01)
*H01R 13/46* (2006.01)
*H01R 13/53* (2006.01)

(52) U.S. Cl.
CPC ......... *H01R 13/422* (2013.01); *H01R 13/465* (2013.01); *H01R 13/53* (2013.01)

(58) Field of Classification Search
CPC .......................... H01R 25/142; H01R 13/518; H01R 23/7005; H01R 27/7068
See application file for complete search history.

(56) References Cited

U.S. PATENT DOCUMENTS

| | | | |
|---|---|---|---|
| 3,576,520 A * | 4/1971 | Stauffer | H01R 13/518 257/725 |
| 3,936,126 A | 2/1976 | Miller | |
| 4,273,402 A | 6/1981 | Hughes | |
| 4,973,263 A | 11/1990 | Nielsen | |
| 5,975,940 A | 11/1999 | Hartmann | |
| 6,093,052 A | 7/2000 | Wang | |
| 6,257,919 B1 | 7/2001 | Cutler et al. | |
| 6,746,286 B2 | 6/2004 | Blaha | |
| 7,722,384 B2 | 5/2010 | Breen, IV | |
| 9,583,862 B1 * | 2/2017 | Haley | G02B 6/4269 |
| 9,780,497 B1 * | 10/2017 | Jeon | H01R 13/659 |
| 2016/0020050 A1 * | 1/2016 | Kawamura | H01H 45/14 200/238 |
| 2019/0252819 A1 * | 8/2019 | Jeon-Haurand | G09F 9/33 |

OTHER PUBLICATIONS

Ideal Industries, Inc., SpliceLine(TM) In-Line Wire Connector, Rev. 3/10, Form No. P-5003, (2010).

\* cited by examiner

*Primary Examiner* — Phuong Chi Thi Nguyen
(74) *Attorney, Agent, or Firm* — John B. Edel; Edel Patents, LLC

(57) ABSTRACT

Junction boxes are disclosed relating to commercial and residential wiring that include a container and multiple push in locking electrical connectors. The push in locking electrical connectors are arranged facing the exterior of the box such that the box is operable without being opened and such that the individual conductors of multiconductor wires may be conveniently wired to separate sets of push in locking electrical connectors electrically joining the multiconductor wires.

14 Claims, 1 Drawing Sheet

JUNCTION BOX

Junction boxes used herein may be used in electrical systems carrying either alternating current or direct current. Certain embodiments disclosed herein include external connections facilitating faster wiring. Embodiments described herein may allow for a fast connection of wires using push in locking electrical connectors.

DETAILED DESCRIPTION

Figure 1:
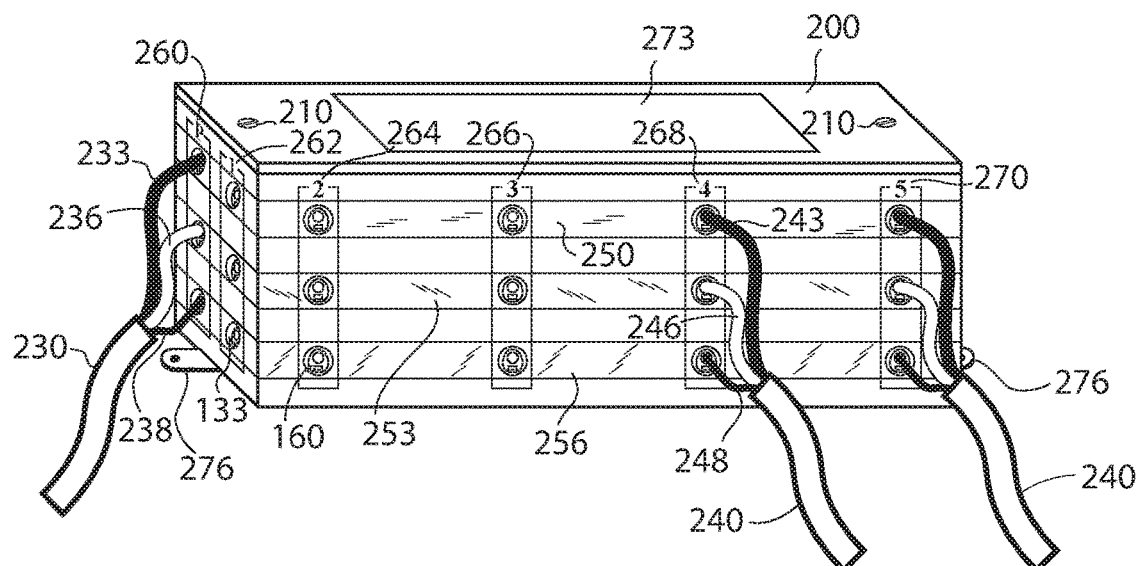
FIG. 1 shows a junction box.
Figure 2:
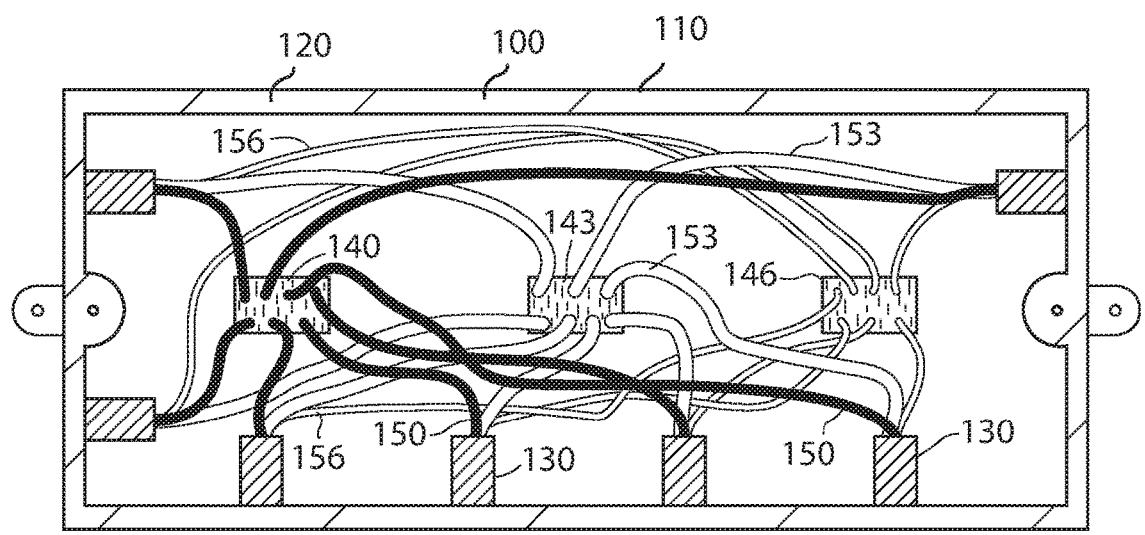
FIG. 2 shows internal wiring of a junction box.

Junction box 100 may comprise a Main body 110 and a Top 200. Main body 110 may for example comprise Box body 120, Connector housings 130, Connector housing internal cavity 133, First common connector 140, Second common connector 143, Third common connector 146, First internal wire set 150, Second internal wire set 153, Third internal wire set 156, and Push in locking connectors 160. Top 200 may for example have Fasteners 210 to attach it to Main body 110. Multi-conductor feed wire 230 may have a First feed conductor 233, a Second feed conductor 236, and a Third feed conductor 238. Multi-conductor distribution wire 240 may have a First distribution conductor 243, a Second distribution conductor 246, and a Third distribution conductor 248. The exterior of Box body 120 may have a First group indicator 250, a Second group indicator 253, a Third group indicator 256, a Power supply set indicator 260, a First distribution set indicator 262, a Second distribution set indicator 264, a Third distribution set indicator 266, a Fourth distribution set indicator 268, a Fifth distribution set indicator 270, Label 273 and Box attachment tabs 276.

Junction box 100 may be used as a replacement for standard junction boxes in a variety of settings. Main body 110 includes connectors wiring and Box body 120 which contains the internal wiring of Junction box 100. Connector housings 130 are individual housings configured to each hold a Push in locking connector 160. Connector housings 130 may be constructed as part of Box body 120 four as a separate component attached to Box body 120. Each of Connector housings 130 contain a Connector housing internal cavity 133 which is designed to house and appropriately position a Push in locking connector 160. The positioning of Push in locking connector 160 within the Connector housings 130 and the selection of appropriate dimensions for the Connector housings 130 may be selected based on convenience after arcing and fire protection considerations are satisfied.

Within Box body 120 First common connector 140, Second common connector 143, and Third common connector 146 are used join groups of associated Push in locking connectors 160. Each Push in locking connector 160 associated with First group indicator 250 has a connection to First internal wire set 150. Each Push in locking connector 160 associated with Second group indicator 253 has a connection to Second internal wire set 153. Each Push in locking connector 160 associated with Third group indicator 256 has a connection to Third internal wire set 156. The connections between First common connector 140 and First internal wire set 150 create a common electrical node such that any wire connected to a Push in locking connectors 160 associated with First group indicator 250 should have a common voltage with any other wire connected to a Push in locking connector 160 associated with First group indicator 250. The connections between Second common connector 143 and Second internal wire set 153 create a common electrical node such that any wire connected to a Push in locking connector 160 associated with Second group indicator 253 should have a common voltage with any other wire connected to a Push in locking connector 160 associated with Second group indicator 253. The connections between Third common connector 146 and Third internal wire set 156 create a common electrical node such that any wire connected to a Push in locking connector 160 associated with Third group indicator 256 should have a common voltage with any other wire connected to a Push in locking connector 160 associated with Third group indicator 256.

Top 200 may be attached to Box body 120 with Fasteners 210 which may be screws or other suitable connectors.

Junction box 100 may be configured such that First group indicator 250 designates positions for the insertion of hot wires taking the form of a black stripe, Second group indicator 253 designates positions for the insertion of neutral wires taking the form of a white stripe, and Third group indicator 256 designates positions for the insertion of ground wires taking the form of a green stripe. A Junction box 100 having these types of indicators may be wired as follows. Junction box 100 may be installed at a suitable location in the vicinity of any outlets, fixtures, or other items needing electrical power using Box attachment tabs 276. A Multi-conductor feed wire 230 coining from a circuit breaker panel, such as a jacketed multi-conductor wire with two 12 gauge coded wires and one 12 gauge bare wire, may connected with Junction box 100 such that: a First feed conductor 233, namely the black hot wire, is securely connected to the Push in locking connector 160 aligned with Power supply set indicator 260 and First group indicator 250; a Second feed conductor 236, namely the white neutral wire, is securely connected to the Push in locking connectors 160 aligned with Power supply set indicator 260 and Second group indicator 253; and a Third feed conductor 238, namely the bare copper wire, is securely connected to the Push in locking connector 160 aligned with Power supply set indicator 260 and Third group indicator 256. Next a Multi-conductor distribution wire 240 similar to Multi-conductor feed wire 230 may be connected with Junction box 100 such that: a First distribution conductor 243, namely the black hot wire, is securely connected to the Push in locking connector 160 aligned with Fourth distribution set indicator 268 and First group indicator 250; a Second distribution conductor 246, namely the white neutral wire, is securely connected to the Push in locking connector 160 aligned with Fourth distribution set indicator 268 and Second group indicator 253; and a Third distribution conductor 248, namely the bare copper wire, is securely connected to the Push in locking connector 160 aligned with Fourth distribution set indicator 268 and Third group indicator 256. Another Multi-conductor distribution wire 240 may then be wired to the set of Push in locking connectors 160 associated with Fifth distribution set indicator 270 in a similar manner. Any of the sets of Push in locking connectors 160 may be used interchangeably and in any order. The designations for the First distribution set indicator 262, Second distribution set indicator 264, Third distribution set indicator 266, Fourth distribution set indicator 268, and Fifth distribution set indicator 270 may be used for the organization of distribution wires in a manner similar to labeling typical of circuit breaker panels. Label 273 may, for example, contain an ordered list with spaces for a user to fill in descriptors for items served by the wire. The system of indicators associated with the various sets and groups aids in organization and error mitigation. The preceding example is merely an illustrative use and Junction box 100 may be used in any number of settings where junction boxes are used including collecting power from multiple sources.

Push in locking electrical connectors having push in connections and locking mechanisms consistent with the examples found in US patent document numbers U.S. Pat. Nos. 3,936,126A, 5,975,940A, 4,973,263A, 6,093,052A, 6,257,919B1, 6,746,286B2, 7,722,384B2, and 4,273,402A among other may be used in the push in locking electrical connectors described herein. Suitable connector types may receive and hold a wire providing a secure mechanical connection resistant to wire pull out and may have electrical connections that are both durable low electrical resistance contact and that minimize opportunities for arcing. An example commercial push in locking electrical connector that may be used is the in-line wire connector model number 42, catalog number 30-1742 sold under the SpliceLine trademark by Ideal Industries, Inc. Becker Place, Sycamore, Ill. 60178.

The push in locking electrical connectors may be positioned within Connector housings 130 recessed from the exterior face of Box body 120 by a distance sufficient to prevent arcing damage to anything beyond the exterior face of the Box body 120. That depth of that recess may, for example, be 0.35 inches with certain examples falling between 0.15 and 0.65 inches and a significant number of those examples falling between 0.23 and 0.55 inches.

Connectors on the exterior of the box may be separated from one another by a distance greater than minimum standards set by the National Fire Protection Association 70 voltage class requirements. For example, the center-on-center separation of the two nearest connectors may, for example, be 1.5 inches with certain examples falling between 1.0 and 2.3 inches and a significant number of those examples falling between 1.3 and 1.9 inches. In a separate but related example, the center-on-center separation of the two nearest connectors that are associated with different types of conductors may, for example, be 1.5 inches with certain examples falling between 1.0 and 2.3 inches and a significant number of those examples falling between 1.3 and 1.9 inches.

Box body 120 and Top 200 may be constructed of a polymeric material such as polyvinyl chloride or may be constructed of metals such as aluminum or stainless steel.

As that term is used herein, a "set" indicates a grouping of connectors. For example, a set of connectors may be used to connect each individual conductor from a multiconductor wire. As that phrase is used herein, a "set span" designates the center-to-center distance of the two most distant connectors within a set.

Various boxes may be constructed consistent with the features described herein. Boxes may be made larger or smaller to varying the number of sets of connectors to accommodate different numbers of connectors for the purpose of accommodating and connecting varying numbers of multiconductor wires and varying numbers of individual conductors within those multiconductor wires. For example, a box may have eight sets of four connectors on the exterior of the box to join eight standard US 12/3 sheathed insulated multiconductor wire cables for a total of 32 exterior facing connectors. Boxes may for example have 2-12 sets of connectors and many examples include 4-8 sets of connectors. Sets of connectors may be sets of 2, sets of 3, sets of 4, or sets of 5 with many examples suitable for residential and commercial power delivery being either sets of 3 or sets of 4. Individual connectors may be configured to securely accept 14 gauge wire, 12 gauge wire, 11 gauge wire, or combinations thereof.

Certain embodiments may be configured specifically for use with one or more of the following types of standard sheathed insulated multiconductor wire cables according to their standard US gauge and conductor count designations: 14/2, 14/3, 12/2, 12/3, 10/2, and 10/3. Boxes may further be configured for other standard wire types including wire types that are conventionally used for audio, video and data. Junction boxes described herein may, for example comprise a container; a first plurality of push in locking electrical connectors configured to receive wire from an exterior of the container; and a second plurality of push in locking electrical connectors configured to receive wire from the exterior of the container; such that the first plurality of push in locking electrical connectors may be electrically connected to one another within the container; a first push in locking electrical connector selected from the first plurality of push in locking electrical connectors and a second push in locking electrical connector selected from the second plurality of push in locking electrical connectors may be part of a first set of push in locking electrical connectors; the first set of push in locking electrical connectors may have a set span of less than three inches; a third push in locking electrical connector selected from the first plurality of push in locking electrical connectors and a fourth push in locking electrical connector selected from the second plurality of push in locking electrical connectors may be part of a second set of push in locking electrical connectors; and the second set may have a set span of less than three inches. In a related example, the second plurality of push in locking electrical connectors maybe electrically connected to one another within the container. In a related example, the first plurality of push in locking electrical connectors may be recessed from the exterior of the container. In a related example, the first plurality of push in locking electrical connectors may be recessed from the exterior of the container by a distance sufficient to prevent arcing damage to anything beyond the exterior face of the container. In a related example, the first plurality of push in locking electrical connectors may be operable without opening the container and the second plurality of push in locking electrical connectors may be operable without opening the container. In a related example, the container may be rated to handle 110 V power. In a related example, the container maybe rated to handle 220 V power. In a related example, the container may meet the NEMA 5 weatherproofing rating for outdoor use. In a related example, the exterior of the container may bear a first visible marking associating the first set of push in locking electrical connectors with a power source. In a related example, the exterior of the container may bear a second visible marking associating the first plurality of push in locking electrical connectors with one another as connectors for a first type of conductor. In a related example, the second visible marking may include color coding. In a related example, the exterior of the container may bear a third visible marking associating the second plurality of push in locking electrical connectors with one another as connectors for a second type of conductor such that the first type of conductor is a hot wire and such that the second type of conductor is a neutral wire. In a related example, the junction box may have a fifth push in locking electrical connector selected from the first plurality of push in locking electrical connectors and a sixth push in locking electrical connector selected from the second plurality of push in locking electrical connectors; such that the fifth push in locking electrical connector and the sixth push in locking electrical connector are part of a third set of push in locking electrical connectors and such that a label on the exterior of the container references the second set of push in locking electrical connectors and the third set of push in locking electrical connectors. Methods of wiring described herein may, for example, include fastening the previously described junction box to a secure location; connecting a first multiconductor wire to the first set of push in locking electrical connectors; connecting a second multiconductor wire to the second set of push in locking electrical connectors; and energizing the first multiconductor wire thereby energizing the second multiconductor wire through the junction box.

References to wire gauge herein refer to the standards for American wire gauge.

As that phrase is used herein "type of conductor" indicates the various types of individual wires found in multi conductor wire as grouped by purpose, color or other similar characteristics. For example, hot, neutral and ground could be considered three separate types of conductors. Further, black, white, red and bare could be considered three separate types of conductors.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

The invention claimed is:

1. A junction box comprising:
  a. a container
  b. a first plurality of push in locking electrical connectors configured to receive wire from an exterior of the container; and
  c. a second plurality of push in locking electrical connectors configured to receive wire from the exterior of the container;
  d. wherein the first plurality of push in locking electrical connectors are electrically connected to one another within the container;
  e. wherein a first push in locking electrical connector selected from the first plurality of push in locking electrical connectors and a second push in locking electrical connector selected from the second plurality of push in locking electrical connectors are part of a first set of push in locking electrical connectors;
  f. wherein the first set of push in locking electrical connectors has a set span of less than three inches;
  g. wherein a third push in locking electrical connector selected from the first plurality of push in locking electrical connectors and a fourth push in locking electrical connector selected from the second plurality of push in locking electrical connectors are part of a second set of push in locking electrical connectors; and
  h. wherein the second set has a set span of less than three inches.

2. The junction box of claim 1 wherein the second plurality of push in locking electrical connectors are electrically connected to one another within the container.

3. The junction box of claim 1 wherein the first plurality of push in locking electrical connectors are recessed from the exterior of the container.

4. The junction box of claim 1 wherein the first plurality of push in locking electrical connectors are recessed from the exterior of the container by a distance sufficient to prevent arcing damage to anything beyond the exterior face of the container.

5. The junction box of claim 1 wherein the first plurality of push in locking electrical connectors are operable without opening the container and wherein the second plurality of push in locking electrical connectors are operable without opening the container.

6. The junction box of claim 1 wherein the container is rated to handle 110 V power.

7. The junction box of claim 1 wherein the container is rated to handle 220 V power.

8. The junction box of claim 1 wherein the container meets the NEMA 5 weatherproofing rating for outdoor use.

9. The junction box of claim 1 wherein the exterior of the container bears a first visible marking associating the first set of push in locking electrical connectors with a power source.

10. The junction box of claim 1:
  a. further comprising a fifth push in locking electrical connector selected from the first plurality of push in locking electrical connectors and
  b. further comprising a sixth push in locking electrical connector selected from the second plurality of push in locking electrical connectors;
  c. wherein the fifth push in locking electrical connector and the sixth push in locking electrical connector are part of a third set of push in locking electrical connectors and
  d. wherein a label on the exterior of the container references the second set of push in locking electrical connectors and the third set of push in locking electrical connectors.

11. The junction box of claim 1 wherein the exterior of the container bears a second visible marking associating the first plurality of push in locking electrical connectors with one another as connectors for a first type of conductor.

12. The junction box of claim 11 wherein the second visible marking comprises color coding.

13. The junction box of claim 11 wherein the exterior of the container bears a third visible marking associating the second plurality of push in locking electrical connectors with one another as connectors for a second type of conductor wherein the first type of conductor is a hot wire and wherein the second type of conductor is a neutral wire.

14. A method of wiring comprising:
  a. fastening a junction box to a secure location wherein the junction box comprises:
    i. a container
    ii. a first plurality of push in locking electrical connectors configured to receive wire from an exterior of the container; and
    iii. a second plurality of push in locking electrical connectors configured to receive wire from the exterior of the container;
    iv. wherein the first plurality of push in locking electrical connectors are electrically connected to one another within the container;
    v. wherein a first push in locking electrical connector selected from the first plurality of push in locking electrical connectors and a second push in locking electrical connector selected from the second plurality of push in locking electrical connectors are part of a first set of push in locking electrical connectors;
    vi. wherein the first set of push in locking electrical connectors has a set span of less than three inches;
    vii. wherein a third push in locking electrical connector selected from the first plurality of push in locking electrical connectors and a fourth push in locking electrical connector selected from the second plurality of push in locking electrical connectors are part of a second set of push in locking electrical connectors; and
viii. wherein the second set has a set span of less than three inches;

b. connecting a first multiconductor wire to the first set of push in locking electrical connectors;
c. connecting a second multiconductor wire to the second set of push in locking electrical connectors; and
d. energizing the first multiconductor wire thereby energizing the second multiconductor wire through the junction box.

\* \* \* \* \*